United States Patent

Stevens

[11] 4,248,212
[45] Feb. 3, 1981

[54] SOLAR HEATING APPARATUS

[76] Inventor: Norman D. Stevens, 1600 S. Farragut St., Bay City, Mich. 48706

[21] Appl. No.: 952,633

[22] Filed: Oct. 19, 1978

[51] Int. Cl.³ .............................................. F24J 3/02
[52] U.S. Cl. .................................. 126/449; 126/429; 126/417; 237/80
[58] Field of Search .............. 126/270, 271, 449, 446, 126/431, 429, 428, 417; 237/1 A, 80

[56] References Cited

U.S. PATENT DOCUMENTS

| | | | |
|---|---|---|---|
| 2,490,659 | 12/1949 | Snyder | 126/271 X |
| 2,998,006 | 8/1961 | Johnston | 126/428 |
| 3,304,005 | 2/1967 | Lytle, Sr. et al. | 237/80 X |
| 3,997,108 | 12/1976 | Mason | 237/1 A |
| 4,046,133 | 9/1977 | Cook | 126/429 |
| 4,059,226 | 11/1977 | Atkinson | 237/1 A |
| 4,144,871 | 3/1979 | Porter | 126/270 |
| 4,154,220 | 5/1979 | Loth | 126/270 |

Primary Examiner—James C. Yeung
Assistant Examiner—Larry Jones
Attorney, Agent, or Firm—Learman & McCulloch

[57] ABSTRACT

A solar heating unit especially adapted for use in conjunction with basementless buildings of the kind having a floor spaced above ground level, which space is traversed by plumbing lines. The solar heating unit includes a chamber into which air drawn from the interior of the building is delivered for absorption of heat and from which chamber heated air is discharged. Heated air discharged from the solar heating unit is delivered selectively to the interior of the building, to insulated enclosures encircling the plumbing lines, or both, or is exhausted to atmosphere.

8 Claims, 3 Drawing Figures

SOLAR HEATING APPARATUS

BACKGROUND OF THE INVENTION

Many kinds of buildings are adapted to be erected, temporarily or permanently, at a particular site which does not include a basement. Mobile homes and manufactured homes are examples of such buildings. A typical mobile or manufactured home has a bottom frame on which wheels are mounted to enable the home to be transported from place to place. When the home is installed at the site at which it is to be used, the home is fixed in a position with the lower frame spaced above ground level. Such sites conventionally include fittings connected at their lower ends to underground sewer and water lines, the fittings extending upwardly above ground level so as to enable them to be coupled by conduits to the plumbing fixtures within the home. The conduits and the upper ends of the fittings thus are exposed to ambient temperatures.

In many parts of the country temperatures reach such low levels that liquids in the conduits freeze. This is compensated for to some extent by the utilization of thermally insulative wrappings around those conduits and pipes which traverse the space between ground level and the bottom of the home. Quite often, however, ambient temperatures reach such low levels that freezing of the liquids nevertheless is encountered, particularly in those instances in which the home is vacant for periods of time.

The heating of homes of the kind referred to above usually is accomplished by means of a furnace connected to a source of fuel oil, natural gas, or bottled gas. Although such homes usually are quite well insulated, the lack of a basement and the exposure of the entire under side of the home to ambient temperatures results in heating inefficiencies and consequent waste of energy.

Apparatus constructed in accordance with the invention is particularly adapted to overcome the aforementioned disadvantages.

SUMMARY OF THE INVENTION

Apparatus constructed in accordance with the invention is adapted for use in conjunction with a mobile or similar home whose floor is spaced above ground level and having plumbing pipes traversing the space between the floor and ground level. A solar energy heating unit has a heating chamber supplied at one end thereof with air drawn from the interior of the home for absorption of heat. Heated air is discharged from the opposite end of the heating chamber through a warm air duct which communicates with one or more tubes that encircle the plumbing lines and with one or more additional tubes which deliver heated air to the interior of the building. The warm air duct preferably includes vent and damper means which enable warm air selectively to be delivered to the aforementioned tubes or exhausted to atmosphere.

THE PREFERRED EMBODIMENT

Figure 1:
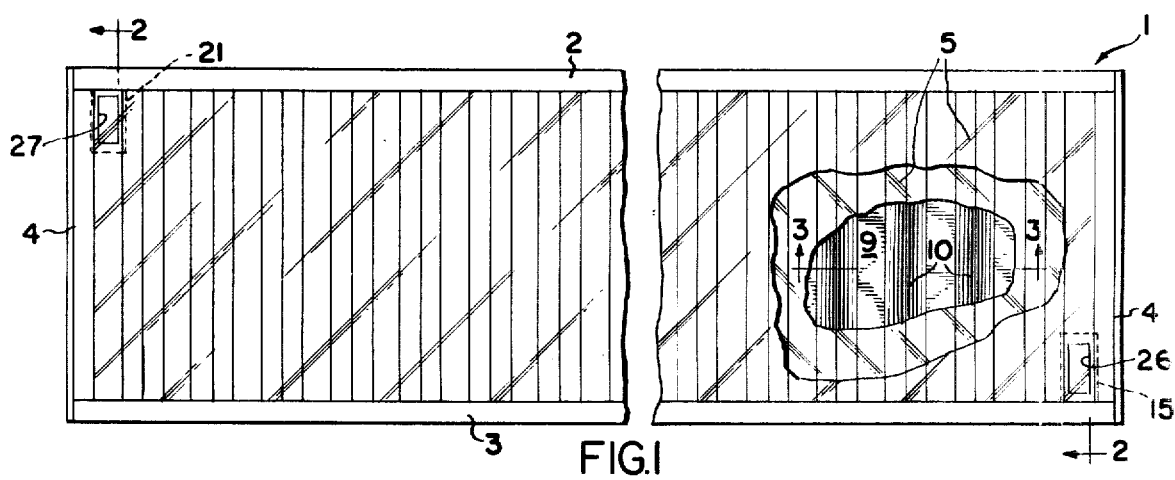
FIG. 1 is an elevational view, partly broken away, of a solar energy heating unit constructed in accordance with a preferred embodiment of the invention.
Figure 2:
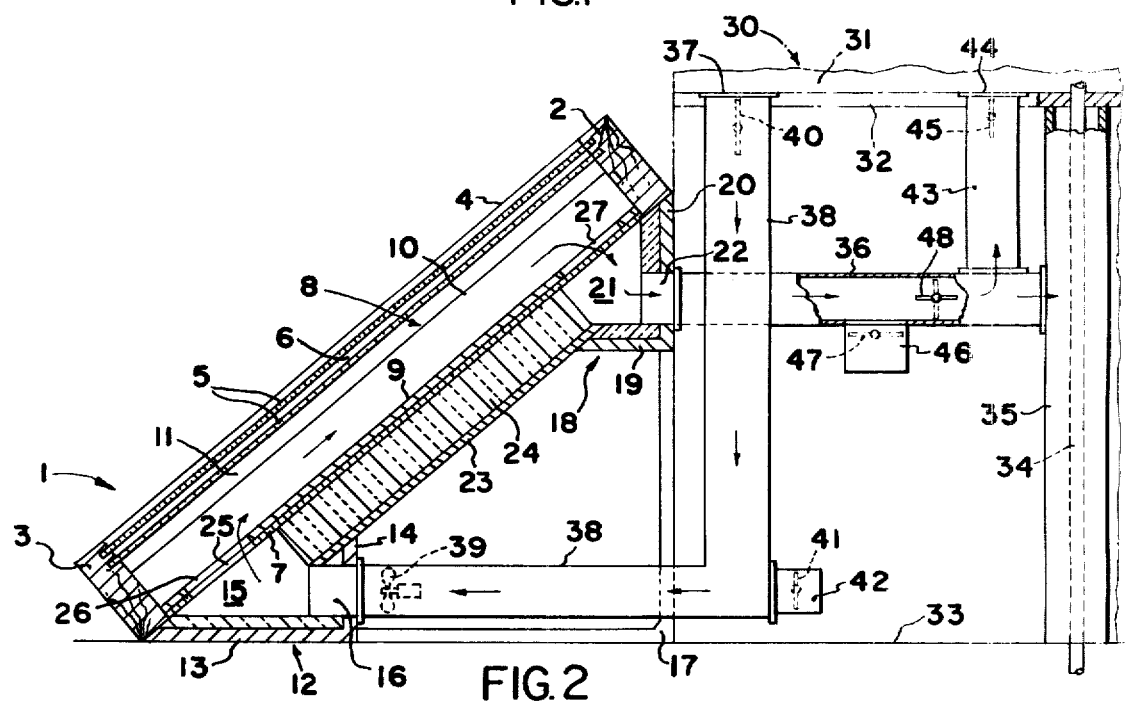
FIG. 2 is a sectional view taken on the line 2—2 of FIG. 1 and illustrating one manner in which the solar heating unit may be associated with a building.
Figure 3:
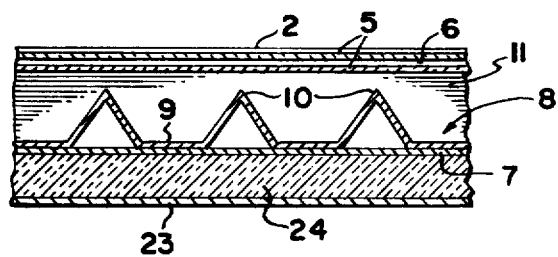
FIG. 3 is an enlarged sectional view taken on the line 3—3 of FIG. 1.

A solar energy heating unit constructed in accordance with the invention is designated generally by the reference character 1 and comprises a rectangular unit having parallel upper and lower frame members 2 and 3, respectively, joined at corresponding ends by cross members 4. The members 2-4 are formed of thermally insulating material, such as wood.

Fitted to the frame members 2-4 and sealed therein is a pair of spaced apart, parallel, sunlight transmitting members 5, such as glass, the space 6 between such members being evacuated. An optional base panel 7, also formed of insulating material, may be fitted to the frame members 2-4 in sealed relation therewith, the member 7 being spaced from and parallel to the members 5. Overlying the member 7 and fixed thereto in any suitable manner is a radiant energy collector 8 formed of aluminum or the like and having a pleated configuration, in cross section, comprising flat webs 9 alternating with conical ribs 10.

The ribs greatly increase the surface area of the collector and present surfaces on which the sun's rays impinge as the earth revolves. The webs 9 are flush with the panel 7 and the conical members 10 project toward the glass panes 5, but terminate short of the innermost pane thereby providing a chamber 11 within the unit 1. That surface of the collector 8 which confronts the glass panes is coated with a heat absorbing material formed by a blacking material of known kind.

The upper and lower edges of the collector 8 preferably are in sealed engagement with the frame members 2 and 3. The space beneath the ribs 10 thus is a dead air space which retains heat.

At the lower end of the unit 1 and underlying the panel 7 is a substantially right angular foot 12 having a horizontal portion 13 and a vertical portion 14, the foot 12 forming with the panel 7 a chamber 15. Adjacent one end of the vertical portion 14 is an opening into which is tightly fitted an air inlet 16 which communicates with the chamber 15. The materials from which the foot is formed preferably are thermally insulating.

A member 18 similar to the foot 12 is provided at the upper end of unit 1 and comprises a horizontal portion 19 and a vertical portion 20. The member 18 preferably is formed Adjacent that end of the chamber 11 remote from the inlet 16 is an air outlet 22 which communicates with the chamber 21.

Between the members 12 and 18 extends a backing member 23 that parallels and is spaced from the member 7. The space between the members 7 and 23 is filled with insulating material 24.

The member 7 is provided with an opening 25 in communication with the air inlet 16, and the web 9 of the collecting member is provided with a registering opening 26 by means of which air from the inlet 16 may enter the chamber 11. The web 9 of the collector 8 adjacent the outlet 22 is provided with a similar opening 27 that registers with an opening (not shown) in the panel 7 so as to provide communication between the chamber 11 and the outlet 22. Air thus is enabled to enter the chamber 11 at the lower end of the unit 1, traverse the length of the chamber 11, and be discharged from the latter at the diagonally opposite corner of the unit 1.

The unit 1 is especially adapted for use in connection with a mobile home 30 having outer walls 31 secured to and upstanding from a floor 32. The floor conventionally is spaced above ground level 33 at the site where the home 30 is located. Sewer and plumbing lines, indicated by the reference character 34, traverse the space between the floor 32 and ground level 33. Such lines conventionally extend below ground level for connection to underground pipes and extend above the level of the floor 32 for connection to plumbing fixtures.

In accordance with the invention the plumbing lines 34 are encircled or enclosed by a tubular enclosure 35, preferably formed of thermally insulating material, and which spans the distance between floor and ground levels. The enclosure 35 is connected by a duct 36 to the air outlet 22.

The air supplied to the unit 1 preferably is from within the home 30 and passes through a grate 37 provided in the floor 30 into a duct 38 which communicates with the inlet 16. A fan or blower 39 preferably is installed in the duct 38 to increase air flow into and through the duct 38. An adjustable damper 40 is mounted in the duct 38 adjacent the grate 37 so as selectively to permit or prevent air from the interior of the home being admitted to the duct 38. A similar damper 41 is mounted in an extension 42 of the duct 38 so as selectively to permit or prevent ambient air being introduced to the duct 38.

Preferably the duct 36 includes a branch 43 which extends from the duct 36 to a grate 44 in the floor 32 of the home. Adjacent the grate is a damper 45 by means of which air is permitted or prevented from entering the home.

Also associated with the duct 36 is a tubular, auxiliary discharge fitting 46 in which is mounted a damper 47. Downstream from the fitting 46 is another damper 48 which, together with the damper 47, enables air from the duct 36 to be discharged through the fitting 46 or discharged to the enclosure 35, the duct 43, or both.

THE OPERATION

To condition the apparatus for operation the unit 1 is placed alongside the home 30 in the inclined position illustrated so as to enable the sun's rays to pass through the glass panes 5 onto the surface of the collector 8. Heat thus will be absorbed by the collector, thereby establishing in the chamber 11 a relatively high temperature. The increase in temperature in the chamber 11 will establish, by convection, air flow through the chamber 11 from the inlet 16 to the outlet 22, regardless of whether the blower 39 is included. Air discharged from the outlet 22 will be conveyed by the duct 36 to the enclosure 35, thereby enveloping the plumbing lines 34 in warmed air.

If the unit 1 is of sufficient size to be used in heating of the home 30, as is preferred, the ducts 38 and 43 and their associated parts, are provided so as to enable air from within the home to be withdrawn via the duct 38 and delivered to the unit 1. Air movement of this kind will necessitate opening of the damper 40 and closing of the damper 41. The air introduced to the unit 1 will be discharged from the latter via the outlet 22 and conducted by the duct 36 to the enclosure 35 and the duct 43. If the damper 47 is closed and the dampers 45 and 48 are open, warm air from the unit 1 will be delivered to the enclosure 35 and to the interior of the home via duct 43 to grate 44. The warm air thus may be used to supplement the heating system of the home.

If the dampers 45 and 48 are open and the damper 47 closed, warm air will be supplied to the enclosure 35 and to the home 30.

When heating of the home 30 and the enclosure 35 is not required, the apparatus may be used for cooling of the home. This may be accomplished by closing the dampers 41, 45, and 48, and opening the dampers 40 and 47. Air thus may be withdrawn from the interior of the home via the grate 37 under the influence of the blower 39, passed through the unit 1, and discharged to atmosphere via the fitting 46. In this case the blower 39 functions in the manner of an exhaust fan.

This disclosure is intended to be illustrative rather than definitive of the invention. The invention is defined in the claims.

I claim:

1. The combination of a solar energy heating unit and a building having a floor through and below which plumbing lines extend downwardly to below ground level, said heating unit comprising a plurality of frame members together forming an enclosure having at one side thereof a sunlight transmitting wall and a base spaced from and opposing said wall; a heat absorbing member pleated to form a plurality of uniform, flat webs seated on said base and alternating with uniform, upstanding, imperforate conical ribs extending toward but terminating short of said wall to define between said wall and said member a chamber, said ribs being sealed at their ends to form dead air spaces between said ribs and said base; first air duct means communicating with said chamber adjacent one end thereof for delivering air into said chamber; second air duct means communicating with said chamber at the opposite end thereof for conducting air out of said chamber; means for establishing air flow through said chamber; insulated conduit means encircling said plumbing lines and spanning the distance between said floor and ground level; and air passage means coupling said second duct means and said insulated conduit means for discharging heated air from said chamber to said insulated conduit means.

2. The combination according to claim 1 wherein said chamber is rectangular and wherein said first and second air duct means communicate with said chamber at diagonally spaced apart zones.

3. The combination according to claim 1 wherein said frame is composed of thermal insulating members except for said sunlight transmitting wall.

4. The combination according to claim 1 wherein said sunlight transmitting wall comprises a pair of glass-like panes spaced from one another.

5. The combination unit according to claim 1 wherein said first air duct has an air inlet remote from said chamber and wherein said second air duct has an outlet remote from said chamber.

6. The combination according to claim 5 wherein said second air duct has an auxiliary outlet opening between said chamber and said outlet, and damper means in said second air duct for diverting air selectively to said outlet and said outlet opening.

7. The combination according to claim 1 wherein said building floor has an opening therein, and air passageway means coupling said second air duct means and said opening for discharging heated air from said chamber to said building.

8. The combination according to claim 7 wherein said building floor has a second opening therein, and air passage means coupling said first air duct means and said second opening for delivering air to said chamber from said building.

* * * * *